US010628764B1

(12) United States Patent
Kaplan et al.

(10) Patent No.: US 10,628,764 B1
(45) Date of Patent: Apr. 21, 2020

(54) METHOD OF AUTOMATICALLY GENERATING TASKS USING CONTROL COMPUTER

(71) Applicant: SYNACK, INC., Redwood City, CA (US)

(72) Inventors: Jay Kaplan, Palo Alto, CA (US); Mark Kuhr, Los Altos, CA (US)

(73) Assignee: Synack, Inc., Redwood City, CA (US)

( * ) Notice: Subject to any disclaimer, the term of this patent is extended or adjusted under 35 U.S.C. 154(b) by 218 days.

(21) Appl. No.: 14/855,120

(22) Filed: Sep. 15, 2015

(51) Int. Cl.
*G06Q 10/06* (2012.01)
*G06Q 10/10* (2012.01)
*H04L 29/06* (2006.01)

(52) U.S. Cl.
CPC ............... *G06Q 10/063112* (2013.01); *G06Q 10/063114* (2013.01); *G06Q 10/1097* (2013.01); *H04L 63/1408* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 7,403,901 B1* | 7/2008 | Carley | ............ | G06F 17/30306 379/111 |
| 8,250,654 B1* | 8/2012 | Kennedy | ............ | H04L 41/22 713/187 |
| 8,464,219 B1* | 6/2013 | Wilkerson | ......... | G06F 11/3664 717/120 |
| 9,325,728 B1* | 4/2016 | Kennedy | ............ | H04L 63/1433 |
| 9,438,634 B1* | 9/2016 | Ross | ............ | H04L 63/20 |
| 2001/0034847 A1* | 10/2001 | Gaul, Jr. | ............ | H04L 63/1433 726/25 |
| 2003/0014669 A1* | 1/2003 | Caceres | ............ | H04L 63/1433 726/25 |

(Continued)

OTHER PUBLICATIONS

Hardaker et al., "Justification and Requirements for a National DDoS Defense Technology Evaluation Facility", DARPA report, Jul. 26, 2002. (Year: 2002).*

(Continued)

*Primary Examiner* — Patricia H Munson
*Assistant Examiner* — Sarjit S Bains
(74) *Attorney, Agent, or Firm* — Hickman Palermo Becker Bingham LLP

(57) ABSTRACT

In one aspect, the disclosure provides: using a control computer logically positioned between one or more researcher computers and one or more systems under test, obtaining a task that identifies a potential security vulnerability of the one or more systems under test; determining a task type of the task associated with particular skills for investigating the potential security vulnerability; identifying a plurality of researcher computers who each have the particular skills; determining a task expiration of the task; determining a respective availability of the plurality of researcher computers; assigning the task to one or more researcher computers of the plurality of researcher computers determined to be available to complete the task; determining and providing an incentive to the one or more researcher computers in response to successfully validating the reports of the potential security vulnerability of the one or more systems under test.

14 Claims, 8 Drawing Sheets

(56) References Cited

U.S. PATENT DOCUMENTS

| | | | | |
|---|---|---|---|---|
| 2003/0028803 | A1* | 2/2003 | Bunker | H04L 12/2602 726/4 |
| 2003/0051163 | A1* | 3/2003 | Bidaud | G06F 21/577 726/25 |
| 2003/0056116 | A1* | 3/2003 | Bunker | H04L 12/2602 726/25 |
| 2003/0172302 | A1* | 9/2003 | Judge | H04L 63/145 726/22 |
| 2004/0010571 | A1* | 1/2004 | Hutchinson | G06Q 10/10 709/220 |
| 2004/0015728 | A1* | 1/2004 | Cole | G02B 5/3083 726/23 |
| 2004/0078384 | A1* | 4/2004 | Keir | G02B 5/3083 |
| 2005/0120242 | A1* | 6/2005 | Mayer | G06F 21/55 726/4 |
| 2006/0018466 | A1* | 1/2006 | Adelstein | H04L 63/1491 380/46 |
| 2007/0011319 | A1* | 1/2007 | McClure | G02B 6/105 709/224 |
| 2008/0209567 | A1* | 8/2008 | Lockhart | G06F 11/3612 726/25 |
| 2008/0222731 | A1* | 9/2008 | Dowd | H04L 63/1433 726/25 |
| 2008/0256638 | A1* | 10/2008 | Russ | G06F 21/577 726/25 |
| 2008/0263671 | A1* | 10/2008 | Solino Testa | G06F 21/577 726/25 |
| 2009/0099885 | A1* | 4/2009 | Sung | G06Q 10/06 726/25 |
| 2011/0138470 | A1* | 6/2011 | Davis | G06F 21/564 726/25 |
| 2011/0173693 | A1* | 7/2011 | Wysopal | G06F 11/3612 726/19 |
| 2011/0314143 | A1* | 12/2011 | Vogel, III | H04L 63/1433 709/224 |
| 2012/0167162 | A1* | 6/2012 | Raleigh | G06F 21/57 726/1 |
| 2012/0185944 | A1* | 7/2012 | Abdine | H04L 63/1433 726/25 |
| 2012/0239459 | A1* | 9/2012 | Vojnovic | G06Q 10/06311 705/7.35 |
| 2014/0047546 | A1* | 2/2014 | Sidagni | G06F 21/577 726/25 |
| 2014/0207509 | A1* | 7/2014 | Yu | G06Q 10/1095 705/7.19 |
| 2014/0283068 | A1* | 9/2014 | Call | H04L 63/1425 726/23 |
| 2015/0082442 | A1* | 3/2015 | Chauhan | H04L 63/1433 726/25 |
| 2015/0106889 | A1* | 4/2015 | Sharabani | H04L 63/1416 726/5 |
| 2015/0154646 | A1* | 6/2015 | Mishra | G06Q 50/24 705/3 |
| 2016/0094573 | A1* | 3/2016 | Sood | H04L 63/1425 713/156 |
| 2018/0046811 | A1* | 2/2018 | Andriani | G06F 21/55 |

OTHER PUBLICATIONS

Feinstein et al. "Statistical Approaches to DDoS Attack Detection and Response", Proceedings of the DARPA Information Survivability Conference and Exposition (D1SCEX'03), Apr. 24, 2003. (Year: 2003).*

Schmidt et al., "A Distributed Denial of Service Testbed", https://hal.inria.fr/hal-01054783, Submitted on Aug. 8, 2014. (Year: 2014).*

* cited by examiner

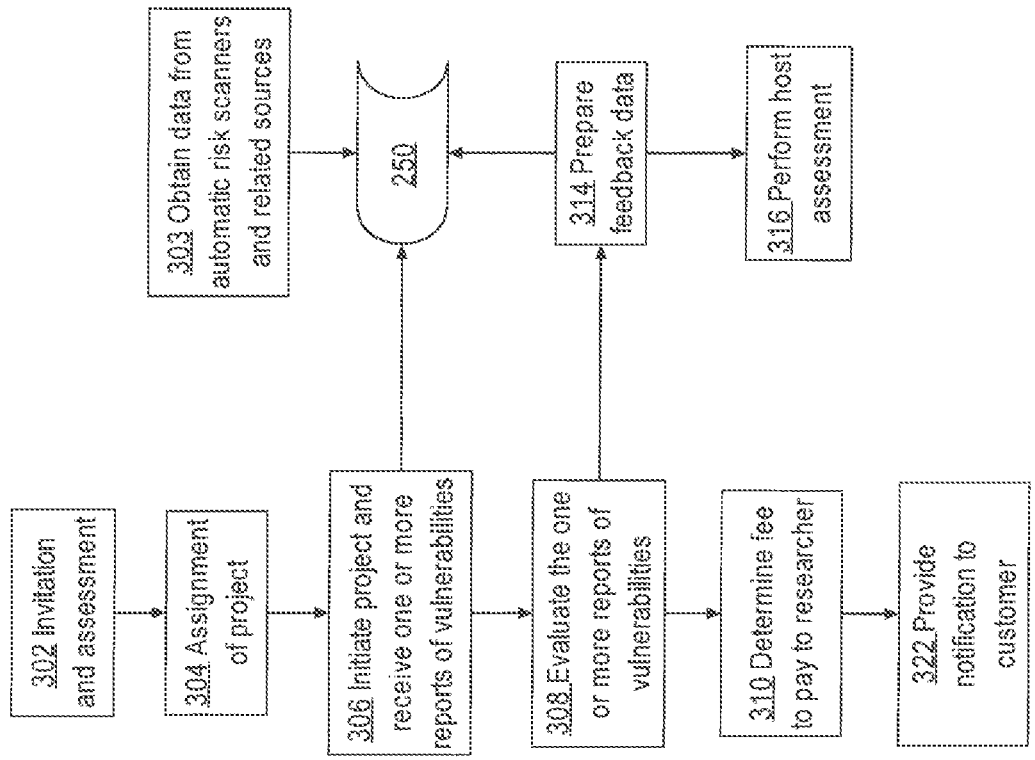

US 10,628,764 B1

METHOD OF AUTOMATICALLY GENERATING TASKS USING CONTROL COMPUTER

FIELD OF THE DISCLOSURE

The present disclosure generally relates to testing of computers relating to security issues. The disclosure relates more particularly to techniques for performing network penetration testing, attack testing, identification of security vulnerabilities, and related security testing of web applications, server computers, and network elements.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Present approaches for identifying security problems in networks have significant drawbacks. Typical network security evaluation, testing and protection involves installing protective elements in the network such as firewalls, virus and malware scanners, and similar systems. These systems receive reports of attack vectors that are occurring in other networks and attempt to determine if the same attacks are occurring in a particular network under test. If so, reports may be prepared and network administrators may manually examine the configuration of internetworking elements, web applications and server computers to determine whether configuration should be changed to remove a problem or prevent an attack.

However, a drawback of these approaches is that they are responsive, rather than preventive. Typically there are so many different kinds of attacks that it is considered impractical for a network administrator, or even a team of security professionals within a large enterprise, to exhaustively test all network elements and computing devices of the enterprise for vulnerability to all known attacks, malware and viruses. Therefore, in current practice many enterprise web applications, server computers and similar gear have a period of continued vulnerability until an actual security event is identified and addressed.

SUMMARY

The appended claims may serve as a summary of the invention.

BRIEF DESCRIPTION OF THE DRAWINGS

In the drawings:

FIG. 3 illustrates a process of application vulnerability discovery integrated with certain computer system elements of FIG. 2.

DETAILED DESCRIPTION

Figure 1:
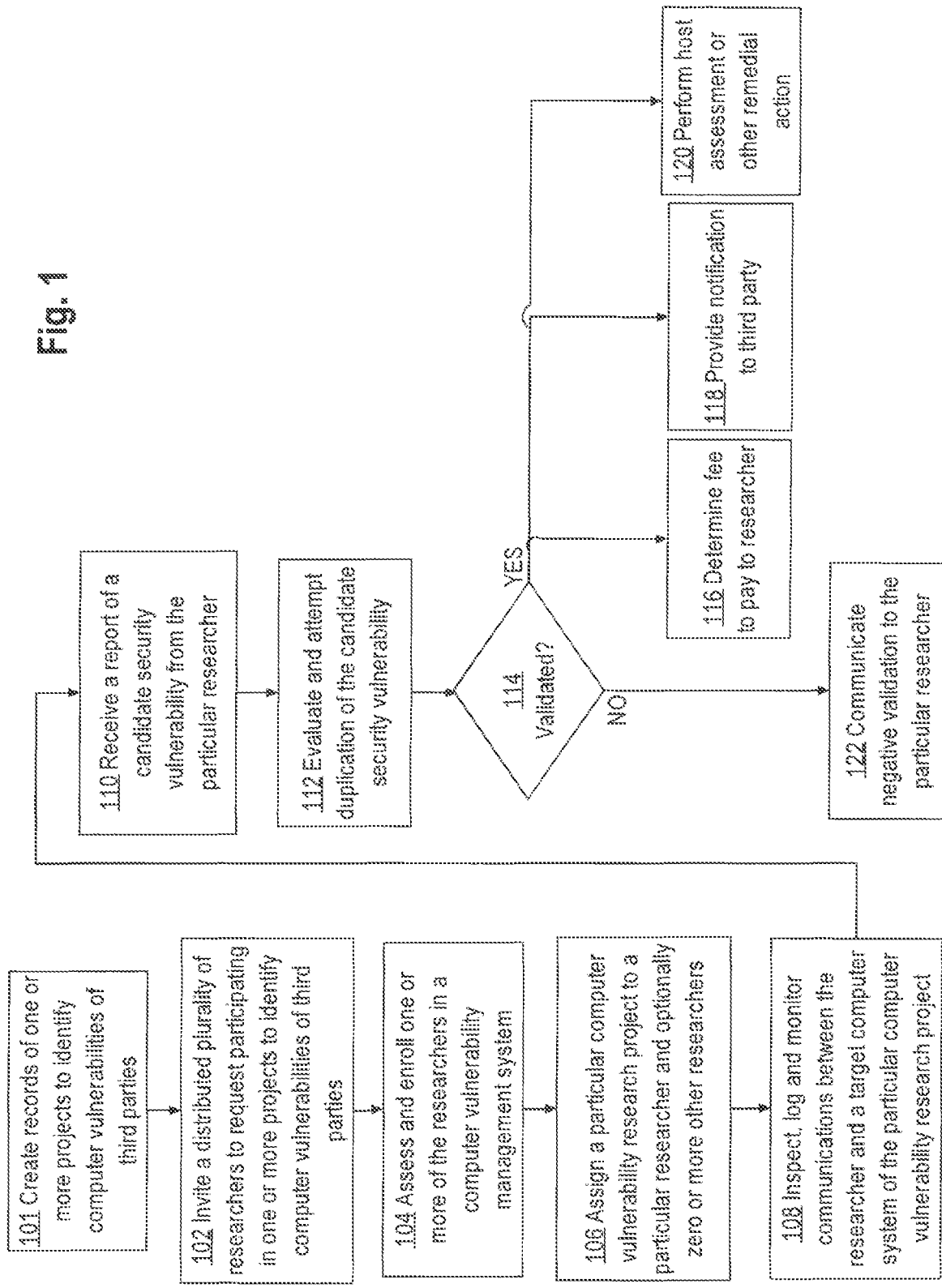
FIG. 1 illustrates a process of crowd-sourced application vulnerability discovery.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described according to the following outline:
 1. General Overview
 2. Crowd-Sourced Application Vulnerability Discovery
 3. System for Globally Distributed Crowd-Sourced Network Penetration Testing
 4. Security Assessment Incentive Program for Promoting the Discovery of Computer Software Vulnerabilities
 5. Implementation Example—Hardware Overview
 6. Automated Task Generation Overview
 7. Systems for Automated Task Generation, Distribution, and Evaluation
 8. Methods for Task Generation
  8.1 Task Creation
  8.2 Task Incentives
 9. Extensions and Alternatives

1. General Overview

In one aspect, the disclosure provides: A method comprising: inviting a distributed plurality of researchers to participate in one or more computer vulnerability research projects directed to identifying computer vulnerabilities of one or more networks and/or computers that are owned or operated by a third party; assessing reputation and skills of one or more of the researchers, and accepting a subset of the researchers who have a positive reputation and sufficient skills to perform the investigations of the computer vulnerabilities; assigning a particular computer vulnerability research project, relating to a particular network under test, to a particular researcher from among the subset of the researchers; using a computer that is logically interposed between the particular researcher and the particular network under test, monitoring communications between the particular researcher and the particular network under test, wherein the communications relate to attempting to identify a candidate security vulnerability of the particular network under test; validating a report of the candidate security vulnerability of the particular network under test that is received from the particular researcher; determining and providing an award to the particular researcher in response to successfully validating the report of the candidate security vulnerability of the particular network under test that is received from the particular researcher.

In another aspect, the disclosure provides: A data processing method comprising: using a computer, inviting a distributed plurality of researcher computers to participate in one or more computer vulnerability research projects directed to identifying computer vulnerabilities of one or more networks and/or computers that are owned or operated by a third party; using the computer, assigning a particular computer vulnerability research project, relating to a particular network under test, to a particular researcher computer from among a subset of the researcher computers; using control logic that is logically interposed between the particular researcher computer and the particular network under test, monitoring networked data communications between the particular researcher computer and the particular network under test, wherein the communications relate to attempting to identify a candidate security vulnerability of the particular network under test; validating a report of the candidate security vulnerability of the particular network under test that is received from the particular researcher computer; performing one or more remediation operations on the particular network under test based at least in part upon the report; wherein the method is performed using one or more computing devices.

In yet another aspect, the disclosure provides: A method comprising: inviting a distributed plurality of researchers to participate in one or more computer vulnerability research projects directed to identifying computer vulnerabilities of one or more networks and/or computers that are owned or operated by a third party; publishing, to the distributed plurality of researchers, a taxonomy of potential computer vulnerabilities, wherein each particular computer vulnerability in the taxonomy is associated with a range of award values; using a computer that is communicatively coupled to a particular researcher among the distributed plurality of researchers and a network under test among the one or more networks and/or computers, monitoring communications between the particular researcher and the particular network under test, wherein the communications relate to attempting to identify a candidate security vulnerability of the particular network under test; in response to a report of the candidate security vulnerability of the particular network under test that is received from the particular researcher, and based upon the taxonomy, determining and providing a particular award value to the particular researcher.

These approaches offer significant benefits over prior practice. In one embodiment, top global security talent previously inaccessible to enterprises can be recruited and incentivized through bounties to discover security vulnerabilities in a variety of target applications and systems. Security resources on a global scale can be safely engaged, and dynamic economics and gamification may be used to incentivize those performing work. Consequently, fees and rewards generate results, rather than generic reports.

In some embodiments, the system described herein can launch a full vulnerability assessment, leading to rapid results, in just a few hours. With little lead time, organizations can obtain rapid feedback, decreasing time to market and enabling patching vulnerabilities before it is too late. The approaches also can be scalable. By using global resources, the approaches can scale to a multitude of assessments at once. For enterprises with large applications or numerous web endpoints, the approaches herein provide a solution to obtain rapid results that are far more effective than traditional automated or manual solutions.

Embodiments also are configured to be adaptable. Assessments can be supported by industry experts who are well-versed in all technology stacks as they evolve. Testing, in embodiments, does not rely upon signatures but uses adversarial tactics to discover the latest zero-day vulnerabilities with methods that provide unique insight into attack vectors. Researchers undergo a strict verification and vetting process, and users of the services described herein can select from among varying levels of trust and verification of the security researchers who conduct the work.

2. Crowd-Sourced Application Vulnerability Discovery

FIG. 1 illustrates a process of crowd-sourced application vulnerability discovery. In an embodiment, a party implementing the process of FIG. 1 may efficiently coordinate with a large number of globally distributed researchers to identify a variety of different computer vulnerabilities of target computers or hosts of a third party computer network. For example, the process of FIG. 1 may be implemented by a service provider that has a contract relationship with a plurality of globally distributed computer security researchers on the one hand, and that has a vendor-customer relationship to the third party owner or operator of a computer system that serves as the target of vulnerability investigation. Using such a three-party approach, including a large number of distributed researchers seeking to identify vulnerabilities in a controlled and monitored manner, computer vulnerabilities can be identified and investigated far faster and more efficiently than in prior approaches.

In one embodiment, at block 101, the process of FIG. 1 includes creating records of one or more projects to identify computer vulnerabilities of third parties. Block 101 broadly represents, for example, a service provider who implements FIG. 1 entering into a contract or other relationship with a third party that owns or operates a computer system or network, and creating records of computers, systems, applications, or other elements that the third party wishes to have evaluated for computer vulnerabilities. The third party and the service provider thus may have a customer-vendor relationship. "Computer vulnerabilities," in this context, includes any of security vulnerabilities, network vulnerabilities, opportunities or data breaches and the like for any of end station computers, server computers, cloud computing instances or resources, internetworking infrastructure such as routers, switches, firewalls and gateways, or other hardware devices, as well as logical or software entities such as database servers, application servers, or online applications such as web applications, mobile applications, etc. The service provider may work closely with organizations to create a project that best fits their budgetary constraints and technical requirements, including in some embodiments performing an initial assessment of the organization's security posture to ensure that the organization is well positioned for the commencement of crowd-sourced vulnerability testing.

Further, block 101 comprises creating records of specific projects to identify vulnerabilities. Project records may be defined by the service provider and the third party, for example, by preparing a topology or other description of specific assets in a network or among a set of computers that the third party desires to check or test.

In one embodiment, at block 102, the process of FIG. 1 includes inviting a distributed plurality of researchers to request participating in one or more projects to identify computer vulnerabilities of third parties. For example, a service provider may use online forums, message boards, e-mail lists, or its own website to promote the opportunity to participate in a crowd-sourced research project directed at computer vulnerabilities. Typically the identities of the third parties are known in advance, as the service provider will have entered into a contract with one or more third parties to provide consulting services, security investigation, or other services to the third party relating to the security posture of its network. However, typically the third parties are not identified at block 102 for purposes of confidentiality. Non-disclosure agreements and other rules of engagement may be implemented as part of bringing researchers onboard; for example, social engineering, DDos, and spam-based attacks may be prohibited, and organizations may define other rules of engagement for a specific area or technology.

In this context, "distributed plurality of researchers" refers to any number of researchers located anywhere in the world. Global or wide area distribution is not required, however. Typically the researchers are not employees of the party implementing the method; the researchers may be previously unknown to the party at the time of the invitation of block 102, or may be known informally through security forums, conferences or other methods.

At block 104, the process comprises assessing and enrolling one or more of the researchers in a computer vulnerability management system. Block 104 may include inspecting credentials of researchers who reply to the invitation of block 102, determine reputation of the researchers, and creating data records in a computer database that identify the researchers and provide contact information, sources of reputation information, resumes or curricula vitae and like information. Assessment at block 104 also may comprise providing responsive researchers with one or more online tests or assessments to determine the level of skill or expertise of the researchers. For example, the party implementing FIG. 1 may maintain a networked computer system that has known vulnerabilities, and may provide responsive researchers with a network address and/or complete or partial login credentials for the system; the researchers then may be directed to attempt to find one or more security vulnerabilities in that system as a means of testing skill and knowledge. Block 104 also may involve updating the database with the results of the assessment.

At block 106, the process comprises assigning a particular computer vulnerability research project to a particular researcher and optionally zero or more other researchers. For example, block 106 may comprise providing a summary of a record of a particular computer vulnerability research project among those that were defined at block 101, and an access location that is associated with the service provider. In an embodiment, block 106 may involve providing a network address or domain address of a target computer to the researcher, and/or partial or complete access credentials for a computer or resource that is associated with the particular computer vulnerability research project. Additionally or alternatively, the particular researcher and any other researchers, are given access credentials or location data for a computer or application that is associated with the service provider, and the researchers then access the target computer or network of the particular vulnerability research project only through the service provider's computer and/or application. In one embodiment, the means of access for researchers is termed a Launch Point; an example detailed description of a Launch Point is provided in other sections herein.

This information may be provided or offered to a particular researcher, or to a group of researchers. The number of researchers involved in a particular project is not limited and there may be benefits involved in assigning a single project to multiple unrelated or distributed researchers to encourage competition to find vulnerabilities. The particular steps or information involved in block 106 are not critical provided that one or more researchers obtain sufficient information to understand the nature and goals of a project, or the identity of a network location or computer that is to be investigated.

At block 108, the process comprises inspecting, logging and monitoring communications between the researcher and a target computer system of the particular vulnerability research project. In general, the process is configured to permit the party implementing FIG. 1 to inspect, log, and/or monitor all electronic communications between the researchers who are assigned to a project and the target computers, networks or systems of the third party. This approach may permit the party implementing FIG. 1 to determine useful assessment data such as: the number of communications between the researcher and the target systems; whether the researcher appears to be actually addressing the subject matter of the particular vulnerability research project; whether the researcher is attempting to access resources of the third party for which access is prohibited or out of scope for the particular vulnerability research project; whether the researcher appears competent and/or diligent; and other metrics.

As an example, block 108 may include storing an audit trail of all URLs that the researcher sends to the target systems; keystroke logging other input of the researcher to the target systems; storing URLs of dynamically generated pages that the target systems may generate in response to action by a researcher; storing individual flow records and/or aggregated flow data based upon packet flow identifiers such as the TCP/IP 5-tuple; storing sets of packets, segments, messages or request-response pairs based upon 5-tuple or other identifying data; and any other data associated with communications between the researchers and the target systems.

At block 110, the process receives a report of a candidate security vulnerability from a particular researcher. In one embodiment, a researcher who thinks s/he has identified a security vulnerability in a target system may submit a report that specifies the vulnerability and identifies the target system. Various formats may be used for submitting reports of apparent security vulnerabilities and the particular form of the report is not critical. An example is provided in another section herein.

At block 112, the process comprises evaluating and attempting to duplicate the candidate security vulnerability that the researcher reported. For example, block 112 may involve re-performing a sequence of operations that are identified in the report, and/or re-performing a sequence of operations that were obtained via block 108. At block 114, the process tests whether the candidate security vulnerability was successfully validated. If not, then at block 122 a negative report or message may be communicated to the researcher, indicating that the vulnerability could not be validated, that further information is needed, or that the report appears to represent something other than a security vulnerability. The particular form and content of such a report or message is not critical.

If the test of block 114 is true, then several operations may be performed, sequentially in any order, or in parallel. At block 116, in one embodiment, the process determines a fee to pay to the researcher. The fee at block 116 may be deemed an incentive award, bounty, service fee or any other form of payment. The fee may comprise value in a recognized hard currency, in an electronic currency such as Bitcoin, and/or in a virtual currency such as tokens, points, or other items that are redeemable in another program, system or facility. Specific techniques for determining the fee of block 116 are described in another section herein.

At block 118, a notification may be provided to the third party. For example, a validated security vulnerability may be described in a report, message or other communication to the third party that owns or operates the network, computer or system that was the subject of the particular computer vulnerability research project. The particular form and content of such a report or message is not critical.

At block 120, the process comprises performing host assessment or other remedial action. For example, block 120 may comprise performing one or more security remediation operations on a host that the researcher identified in the report of block 110, such as installing software updates, changing configuration data, reconfiguring a position of a unit in a network topology, updating the configuration of automatic attack detection systems such as intrusion detection systems, and other operations.

As a result, the approach of FIG. 1 may lead to more rapid identification and remediation of vulnerability issues in computers or networks by providing a way to induce a potentially large number of distributed researchers to attempt attacks, intrusions, or other exploitation of vulnerabilities of the computer or networks, optionally in return for a fee, award or other recognition. A party implementing FIG. 1, such as a service provider, serves as an intermediary between the distributed researchers and the target computers or networks, so that all communications of the researchers-which may include actual attack attempts—can be inspected, monitored and logged. Further, the third party that owns or operates the network that is the subject of an investigation can receive reports, remediation operations, and/or configuration data based upon the work of the distributed researchers after validation by the service provider. All these features and aspects may provide a greatly improved, more efficient and more effective process for identifying and addressing computer vulnerabilities.

Figure 2:
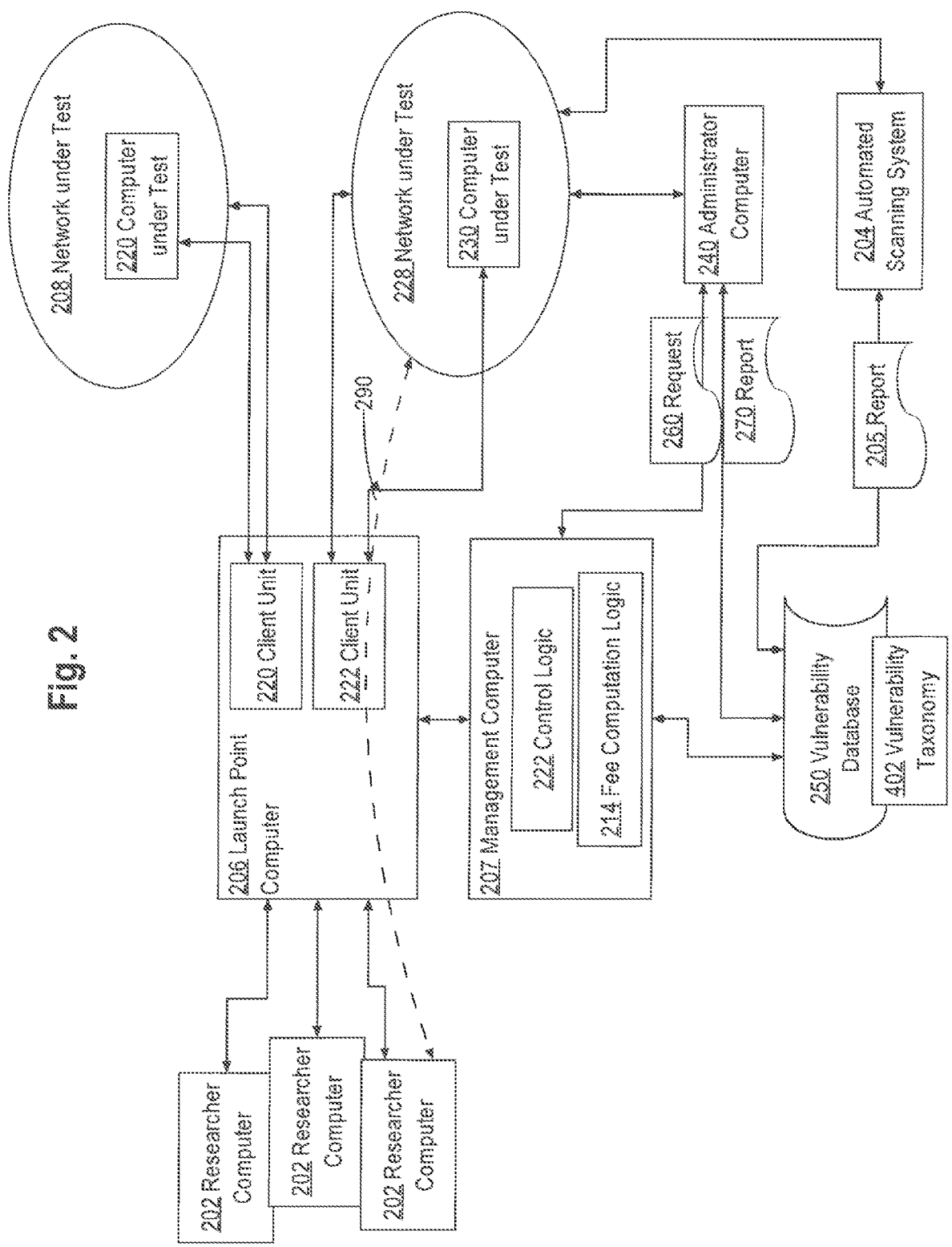
FIG. 2 illustrates an example computer system arrangement that may be used for crowd-sourced web application vulnerability discovery, providing globally distributed network penetration testing, and determining incentives for promoting the discovery of vulnerabilities.

3. System for Globally Distributed Crowd-Sourced Network Penetration Testing FIG. 2 illustrates an example computer system arrangement that may be used for crowd-sourced web application vulnerability discovery, providing globally distributed network penetration testing, and determining incentives for promoting the discovery of vulnerabilities. FIG. 3 illustrates a process of application vulnerability discovery integrated with certain computer system elements of FIG. 2. Referring first to FIG. 2, in one embodiment, a plurality of researcher computers 202 are coupled via one or more networks and/or internetworks to a Launch Point computer 206. An automated scanning system 204, management computer 207, vulnerability database 250, and one or more networks under test 208, 228 also are communicatively coupled to the Launch Point computer 206. For purposes of illustrating a clear example, FIG. 2 shows a limited number of researcher computers 202, automated scanning system 204, network under test 208, 228, computer under test 226, 230, and client units 220, 222, but in practical embodiments the number of such units is not limited; embodiments may interoperate with at least thousands of distributed researchers with computers and with any number of customer networks under test having any number of computers or other nodes under test.

In an embodiment, each of the researcher computers 202 is associated with one of a plurality of distributed researchers of the type previously described. The researcher computers 202 may comprise any of desktop computers, workstations, laptop computers, netbook computers, ultrabook computers, tablet computers or smartphones. The researcher computers 202 are coupled indirectly to the Launch Point computer 206 by any combination of one or more local area networks, wide area networks, internetworks and the like, which may include the public internet.

Launch Point computer 206 comprises, in one embodiment, one or more client units 220, 222, and may be coupled to a management computer 207 comprising control logic 224 and fee computation logic 214 and coupled to a vulnerability database 250. In an embodiment, the Launch Point computer 206 acts as a terminal that is configured for the purposes of providing network connectivity and monitoring for communications between researcher computers 202 and the networks under test. Moreover, the logical position of Launch Point computer 206 between the researcher and the network under test provides secure routing of researcher communications to networks under test and provides a predictable source IP address for the owner/operator of the network under test, to enable adjustment of firewalls and/or IPS/IDS devices.

In an embodiment, each of the client units 220, 222 is configured to communicate to a different computer under test 226, 230 located respectively in a different network under test 208, 228. Each client unit 220, 222 thus is configured to cooperate with Launch Point computer 206 in acting as an intermediary between one or more of the researcher computers 202 and one of the networks under test 208, 228 and/or one of the computers under test 226, 230. As indicated by arrow 290, each of the researcher computers 202 may establish a logical bidirectional communication path to one or more of the networks under test 208, 228, with all communications passing through Launch Point computer 206 for purposes of controlling which particular researcher computers are connected to which particular network under test and for monitoring, logging and/or analysis. As further described herein, control logic 222 may be configured to provide a particular researcher computer 202 with access to a particular network under test 208, 228 only under specified circumstances including after assessment, testing, assignment of a project, or other operations. Thus, researcher computers 202 typically cannot contact the networks under test 208, 228 at will; instead, the Launch Point computer 206 must facilitate access, grant access or provide credentials.

Control logic 224 is configured, in an embodiment, to implement the control functions and management functions that are described further herein. Fee computation logic 214 is configured, in an embodiment, to determine a fee, award, bounty or other payment, value or currency that is due or payable to one of the researchers in consideration for identifying a vulnerability of one of the computers under test 226, 230 or networks under test 208, 228. Techniques for computing applicable fees are described herein in other sections. Each of the control logic 224 and fee computation logic 214 may be implemented using one or more computer programs, other software elements, other digital logic as described for FIG. 5, or any combination thereof.

An automatic scanning system 204 may be coupled to one or more of the networks under test 208, 228 and/or to one or more of the computers under test 226, 230 and may generate one or more reports 205 based upon performing automatic scanning operations on those networks or computers. The reports 205 may be received at vulnerability database 250 to provide baseline vulnerability data or to assist in defining the computer vulnerability projects that may be offered to researchers. Additionally, in an embodiment, control logic 224 may implement a feedback loop in relation to automatic scanning system 204 by which the control logic provides updates to configuration data or other input to the automatic scanning system, based upon validated vulnerability reports from researchers, to improve the ability of the automatic scanning system to detect other vulnerabilities in the future in relation to the networks under test 208, 228 or the computers under test 226, 230.

A vulnerability database 250 may be coupled to Launch Point computer 206 and may be configured to store metadata or substantive data about researchers, researcher computers 202, client units 220, 222, networks under test 208, 228, computers under test 226, 230, and other data useful to support operation of the system. In an embodiment, management computer 207 or another computer may host a web application that enables clients and researchers to collaborate regarding fixing vulnerabilities that have been input to the vulnerability database 250.

A particular network under test 228 may be coupled to an administrator computer 240 that is associated with a network administrator for that network. In an embodiment, control logic 224 is configured to receive one or more requests 260 from the administrator computer 240 via a client web interface hosted at management computer. The requests typically relate to performing vulnerability tests on the associated network under test 228, or the computer under test 230 within that network or other nodes of that network. Control logic 224 also may be configured to generate and send one or more reports 270 to the administrator computer 240 relating to security vulnerabilities that have been identified in the associated network under test 228, or the computer under test 230 within that network or other nodes of that network.

Thus, it may be seen from FIG. 2 that embodiments may provide a Launch Point computer 206 associated with a first party, logically arranged as an intermediary between the researcher computers 202 associated with second parties and the networks under test 208, 228 and computers under test 226, 230 of third parties. Input from the Launch Point computer 206 may be used to update an automatic scanning system 204 to improve its performance, and administrators associated with administrator computer 240 may receive reports about vulnerabilities that are found.

Referring now to FIG. 3, in an embodiment, a process of crowd-sourced application vulnerability discovery may be integrated with selected technical elements of FIG. 2 to efficiently coordinate with a large number of globally distributed researchers to identify a variety of different computer vulnerabilities of target computers or hosts of a third party computer network.

At block 302, invitation and assessment is performed. In an embodiment, a party implementing FIG. 3 takes steps to identify and invite researchers, and in some embodiments block 302 may represent performing blocks 101, 102, 104 of FIG. 1 as described above. Assessment may include investigation of social media postings of candidate researchers and other online sources of data to determine, for example, that a particular researcher is a so-called white hat hacker and not a malicious computer user. Assessment may include an interview process, which may comprise in part a live interview of the candidate researcher, background checks of the candidate researcher, skill tests, identity verification, and other investigation. Assessment further may comprise performing a randomized technical exam of a candidate researcher in which the researcher is required to classify issues relating to web application security, mobile application security, infrastructure, and other issues. A practical assessment of skills in this manner may serve as a precondition for receiving an invitation to join a team of researchers. Results may be used to segment researchers into various trust categories based upon user requirements; the level of trust can be used to affect the amount of a bounty that is later calculated.

In an embodiment, block 302 also may involve storing data that segments or classifies the researcher based upon citizenship, levels of permissible government access, residence or domicile, or other factors; the database 250 may be updated with tags in records that identify researchers for these attributes.

At block 304, assignment of a project occurs. In an embodiment, block 304 presumes that the service provider operating Launch Point computer 206 and the third party of network under test 208, 228 have defined one or more computer vulnerability projects. Defining projects may comprise, for example, by preparing a topology or other description of specific assets in the network under test 208, 228 that the third party desires to check or test and creating records of projects in database 250. Additionally or alternatively, the automated scanning system 204 may provide reports 205 that may suggest vulnerabilities or indicate anomalies that indicate that vulnerabilities exist; data in the reports may be used to form records of projects for investigation.

Block 304 may include the operations of block 106 described above. Further, assignment of a project may comprise granting access to a researcher to a web portal for web applications that are within the scope of the project. The web portal may provide, for example, a screen view that displays the identity and general content of computers, networks or other resources that are within the scope of a particular vulnerability research project. Typically, the identity of customers of the party that implements FIG. 3 are anonymized so that researchers are not aware of exactly whom they are attacking, to prevent the introduction of bias into the vulnerability detection process. In one embodiment, assignment of a project may include receiving a sign-up request for a specific project or target. Obtaining agreement of the researcher to a customer-specific confidentiality agreement may be required as part of the assignment process.

At block 306, the project is initiated by the researcher and the party implementing FIG. 3 receives one or more reports of computer vulnerabilities within the scope of the assigned project. Block 306 may represent the operation of blocks 106, 108, 110 of FIG. 1 as described above. Further, in one embodiment, initiating a project comprises instantiating a virtual machine in a shared data center, such as a cloud computing facility, that implements the Launch Point computer 206 as a server instance or other computing instance. Thus, the Launch Point computer 206 may be spun up on demand. Any such server may be instantiated at a geographical location that is based upon a location of the particular researcher who is involved in a project; thus, for example, if the service provider who implements FIG. 3 is located in Los Angeles, the network under test 208 is located in New York, and the researcher computer 202 of a researcher assigned to that network is located in Miami, then the Launch Point computer 206 might be spun-up preferably at a data center in Atlanta or Miami rather than a data center in New York or Los Angeles.

Block 306 further comprises monitoring and optionally logging all tests, messages and between an assigned researcher computer 202 and a target network or computer; thus, all tests funnel through the infrastructure of the service provider to permit logging activity and capturing actions taken by a researcher.

Reports of vulnerabilities may be received periodically from any of the researchers who are assigned to a project. In an embodiment, data comprising a vulnerability report is received in the same view or user interface facility that is used to obtain data about projects, target computers and target networks. In an embodiment, to report a prospective vulnerability, the researcher enters a category value and optionally a sub category value for the vulnerability that they are reporting. The category and sub category values are deemed proposed and are subject to validation by the service provider. In some embodiments, reporting a prospective vulnerability may comprise receiving data values in fields of a submission form. As an example, a submission form may comprise data fields for: Title; Description; Vulnerability Category, which may be selected from a drop-down menu or other GUI widget; Steps to Reproduce the vulnerability; Impact of the vulnerability; Secret gist for one or more codes that were used to determine the vulnerability; Recommended Fix; and URL identifier for a URL at which the vulnerability exists.

In some embodiments, reporting a proposed vulnerability also comprises receiving answers to a questionnaire Examples of questions include:
1. Is an authenticated login required? Yes, No
2. What is the impact to confidentiality? None, Yes for a single user, Yes for more than one user.
3. Is the integrity of application or user data compromised? No, Yes for a single user, Yes for more than one user.
4. Could this vulnerability have any impact on application availability? No, Yes for a single user, Yes for more than one user.

At block 308, the reported vulnerability is evaluated and validated, which may include the operation of blocks 112, 114 of FIG. 1. In an embodiment, evaluation of a vulnerability may comprise deduplication, which involves checking whether another researcher has previously reported the identical vulnerability or a substantially similar vulnerability. Deduplication may comprise performing a literal or fuzzy comparison of the values received in response to the questionnaire, and other data received from the researcher about the suggested vulnerability, to records of previously reported vulnerabilities in database 250. Evaluation of a vulnerability also may comprise verifying the quality of a submission and requesting more information if needed. Evaluation of a vulnerability also may comprise validating the report by re-performing the exact attack that was reported to check that what the researcher reported is a genuine vulnerability.

At block 310, the process determines a fee to be paid to the researcher who reported the proposed vulnerability as noted above for block 116. In one approach, block 310 is configured, based on the answers that were received to the questionnaire described above, to calculate a vulnerability score such as a CVSS score, and to map the category and subcategory of vulnerability and the CVSS score to a minimum price and a maximum price. The CVSS score may be scaled linearly to a price between the minimum and maximum price, using a stored mapping to a price for a bounty to be paid. Typically a score value of 0 maps to the minimum price and a score value of 10.0 maps to the maximum price, after summing all the CVSS components. In this manner, embodiments can provide a real-time, market value calculation for the value of a reported vulnerability.

Figure 4B:
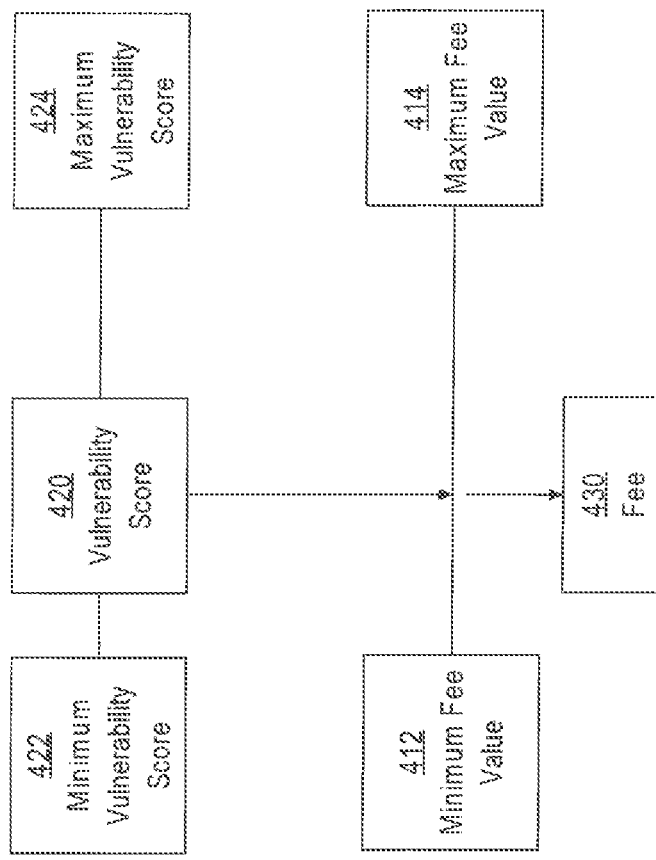
FIG. 4B illustrates determining an incentive award to a researcher for discovering a vulnerability.
Figure 4A:
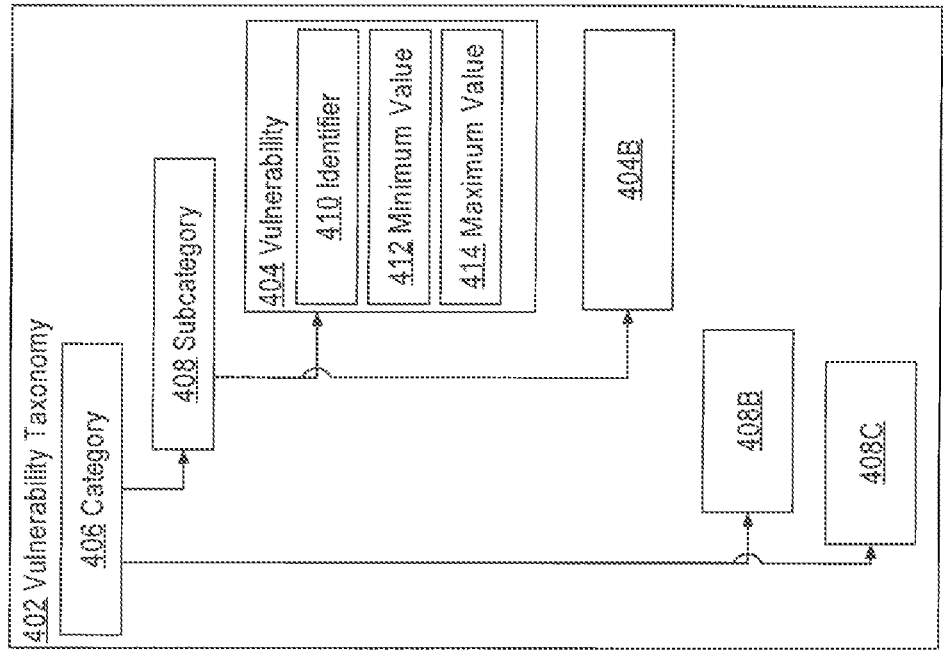
FIG. 4A illustrates a mapping of vulnerability categories, in a taxonomy, to ranges of incentive award amounts.

For purposes of determining fees, deduplication and other purposes, the control logic may be configured to manage a vulnerability taxonomy in the database 150 that associates categories, subcategories, vulnerability names, and a range of fees. FIG. 4A illustrates an example vulnerability taxonomy, and FIG. 4B illustrates an example mapping of a particular vulnerability score to a particular fee. Referring first to FIG. 4A, in one embodiment, a vulnerability taxonomy 402 comprises a plurality of any number of categories 406, 406B, 406C. A category 406 may have any number, including zero, of subcategories 408, 408B, 408C. A category 406 or a subcategory 408 may be associated with one or more vulnerabilities 404, of which one is shown in FIG. 4A for purposes of illustrating a clear example.

In an embodiment, a particular vulnerability 404 comprises an identifier 410, a minimum value 412 and a maximum value 414. The identifier 410 may be any label that enables human and/or machine recognition of a particular vulnerability. Identifier 410 may comprise a value that is usable in programmatic operations, or a displayable name, or both. The minimum value 412 represents a minimum amount of a fee that is payable to a researcher for identifying the associated vulnerability in a target system; the maximum value 414 represents a maximum of such a fee. The minimum value 412 and the maximum value 414 may be represented using any form of units. In one embodiment, integers representing US dollars are used.

Referring now to FIG. 4B, in an embodiment, the minimum value 412 and maximum value 414 may be used as endpoints of a fee range. The vulnerability score 420 for a particular vulnerability, which may be determined using CVSS or other scoring, also lies within a separate range having a minimum score value 422 and a maximum score value 424. In an embodiment, the particular vulnerability score 420 is linearly mapped from its position in the range of score values to an equivalent position in the range of fees, resulting in selection or computation of a particular fee 430 for the associated vulnerability having the particular vulnerability score 420.

Computation of a CVSS score may be performed according to NIST standards, using the following expressions:

$$\text{BaseScore} = (0.6 * \text{Impact} + 0.4 * \text{Exploitability} - 1.5) * f(\text{Impact})$$

$$\text{Impact} = 10.41 * (1 - (1 - \text{ConfImpact}) * (1 - \text{IntegImpact}) * (1 - \text{AvailImpact}))$$

$$\text{Exploitability} = 20 * \text{AccessComplexity} * \text{Authentication} * \text{AccessVector}$$

where the following variables have the following values:
access_complexity: 0.61
access_vector: 1.0
authentication:
   question: "Is an authenticated login required?";
   answers: "Yes.": 0.56; "No.": 0.704
confidentiality_impact:
   question: "What is the impact to confidentiality?";
   answers: "None.": 0.0; "Yes, for a single user.": 0.275; "Yes, for more than one user.": 0.660
integrity_impact:
   question: "Is the integrity of application or user data compromised?"; answers: "No.": 0.0; "Yes, for a single user.": 0.275; "Yes, for more than one user.": 0.660
availability_impact:

question: "Could this vulnerability have any impact on application availability?"; answers: "No.": 0.0; "Yes, for a single user.": 0.275; "Yes, for more than one user.": 0.660

The following is an example description of a vulnerability that is nested one level down in a taxonomy of vulnerabilities and is associated with particular specified prices:
sql_injection:
    display: "SQL Injection"
    poorly_filtered_strings:
        display: "Poorly Filtered Strings"
        min: 1500.0
        max: 2000.0

The resulting price may be provided to the researcher and existing payment networks or other transfer systems may be used to convey a fee equal to the price, or other items or virtual currency, to the researcher. In an embodiment, pricing is standardized regardless of customer; this sets expectations among the researcher community so they always know if they find a particular hard vulnerability that they will get a specified amount.

Referring again to FIG. 3, in an embodiment, at block 322, the process provides a notification to the customer as generally described above for block 118 of FIG. 1. In an embodiment, the Launch Point computer 206 may host an application program, web server or the equivalent that provides a separate portal into which a customer of the service provider may log into. In an embodiment, the customer portal provided by management computer 207 may enable customers to obtain and display, via administrator computer 240 for example, a view of vulnerabilities that have been identified by the researcher computers 202, organized according to particular assets within a network under test 208. Assets, in this context, may comprise computers, elements of networking infrastructure, applications, or other nodes or items. The customer portal may enable, in one embodiment, the customer to change the status of a particular vulnerability to identify remediation steps that the customer has undertaken for an associated asset or for the vulnerability as a whole. In an embodiment, the control logic 224 may be configured to export data representing vulnerability reports and/or remediation efforts to a bug tracking application, such as JIRA, commercially available from Atlassian Pty Ltd., Sydney, Australia.

In an embodiment, control logic 224 may be configured to facilitate direct communication between administrator computer 240 and a particular researcher computer 202 that is associated with a researcher who identified a particular vulnerability. In such an embodiment, Launch Point computer 206 may act as an intermediary for such communications and may log messages or serve as a message store-and-forward service with which the administrator computer 240 may compose a message and request dispatch to the particular researcher computer 202. In this manner, the administrator computer 240 of a particular customer of the Launch Point computer 206 may re-engage the researcher computer 202, for example, to request a re-validation to check if a particular vulnerability was successfully corrected or patched as a result of remediation operations that the customer performed. In some embodiments, the management computer 207 or another system may convey a fixed fee to the researcher computer 202 in consideration for such a re-evaluation.

In an embodiment, at block 314 of FIG. 3, the process prepares feedback data and provides the feedback data to the database 240 and/or to the automatic risk scanners 204. For example, control logic 224 may be configured to transform a specific vulnerability into a generic description of the vulnerability so that the same class or type of vulnerability can be found in other apps of the same type. The generic description may be formatted according to a general protocol or may be expressed in terms of operations, syntax, semantics, or configuration data that is compatible with a particular one or more of the automated risk scanners 204. In this manner, a particular vulnerability that is identified by any of the researcher computers 202 may be used to update the automated vulnerability scanners 204 so that finding new vulnerabilities becomes more difficult for the researcher computers over time.

At block 316, one or more host assessment operations may be performed, as generally noted above for block 120 of FIG. 1. In one embodiment, host assessment comprises generating one or more sets of fingerprint data that represent a hardware configuration and software configuration or posture of a particular asset in a network under test 208. In an embodiment, the fingerprint data may represent configuration of an asset at the patch level, and the fingerprint data may be provided to the automatic vulnerability scanners 204 to permit improved scanning of hardware, software and services. Any form of signature data may be used, pertaining for example to application semantics.

4. Security Assessment Incentive Program for Promoting the Discovery of Computer Software Vulnerabilities Embodiments may be used to implement incentive programs to induce or encourage the researcher computers 202 to locate vulnerabilities. In one embodiment, as described above for FIG. 1 and FIG. 3, a process of identifying computer vulnerabilities may integrate the offering, determination and payment of fees to researchers as an inducement to discovery vulnerabilities. The inducement benefit of such a method may be enhanced, in one embodiment, by publishing an approximate range of fees that will be paid and information about how a vulnerability score of a particular vulnerability is mapped within the range to yield a particular fee. In this manner, researchers in the field receive objectively understandable information about how a fee will be determined and paid, which should improve confidence in the overall method and system.

In another embodiment, the methods of FIG. 1, FIG. 3 may be supplemented with gamification operations. For example, in one embodiment, the methods of FIG. 1, FIG. 3 also include, and/or the control logic 224 is configured to provide, assigning a quantity of points to a particular vulnerability, rather than only a fee. For example, metadata representing a vulnerability as seen in FIG. 4A also may include a minimum points value and a maximum points value, and the process of FIG. 4B also may include determining a particular points value for a particular vulnerability by mapping the vulnerability score within a range of points defined by the minimum points value and maximum points value. Determining the particular points value may use a linear mapping or a non-linear, weighted and/or scaled mapping in various embodiments. In one embodiment, the mapping may use a blended mapping function that blends values for vulnerability score, a submission quality score that represents the quality of a vulnerability report or submission, a perceived value of the asset in the network under test 208, and/or other values.

Further, FIG. 1, FIG. 3, and/or control logic 224 may be configured to create, store and/or cause displaying a leaderboard that identifies the researcher computers 202 and the total points or particular points values that the researchers have earned or obtained. Researcher computers 202 may be identified using pseudonyms, screen names or handles.

FIG. 1, FIG. 3, and/or control logic 224 may be configured to determine one or more prizes that are awarded to the researcher computer 202 or researcher who achieves the highest number of points within a particular award period such as within a particular month.

FIG. 1, FIG. 3, and/or control logic 224 may be configured to create, store and/or cause displaying data representing accomplishment levels for particular researcher computers 202 based upon total points that are earned by or awarded to the researchers. For example, a particular achievement may be associated with identifying a particular number of vulnerabilities, earning a particular number of points, or earning fees at a particular total amount. Each achievement may be associated with a graphical icon such as a badge, or may be associated with a prize, fee, virtual currency, admission to an event, or other award or recognition for the researcher or researcher computer 202.

FIG. 1, FIG. 3, and/or control logic 224 may be configured to facilitate redemption of points for things that are consistent with the white-hat role of the researcher computers 202. For example, FIG. 1, FIG. 3, and/or control logic 224 may be configured to facilitate redeeming points awarded in any of the foregoing embodiments for travel, gifts, dining, or other things. FIG. 1, FIG. 3, and/or control logic 224 may be configured to perform transfer of points earned using the methods or system to external systems, including loyalty points systems, using electronic interfaces to those systems and according to specified transfer ratios that transform points earned for finding computer vulnerabilities into airline points, hotel points, dining points, or other kinds of points of third-party systems.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
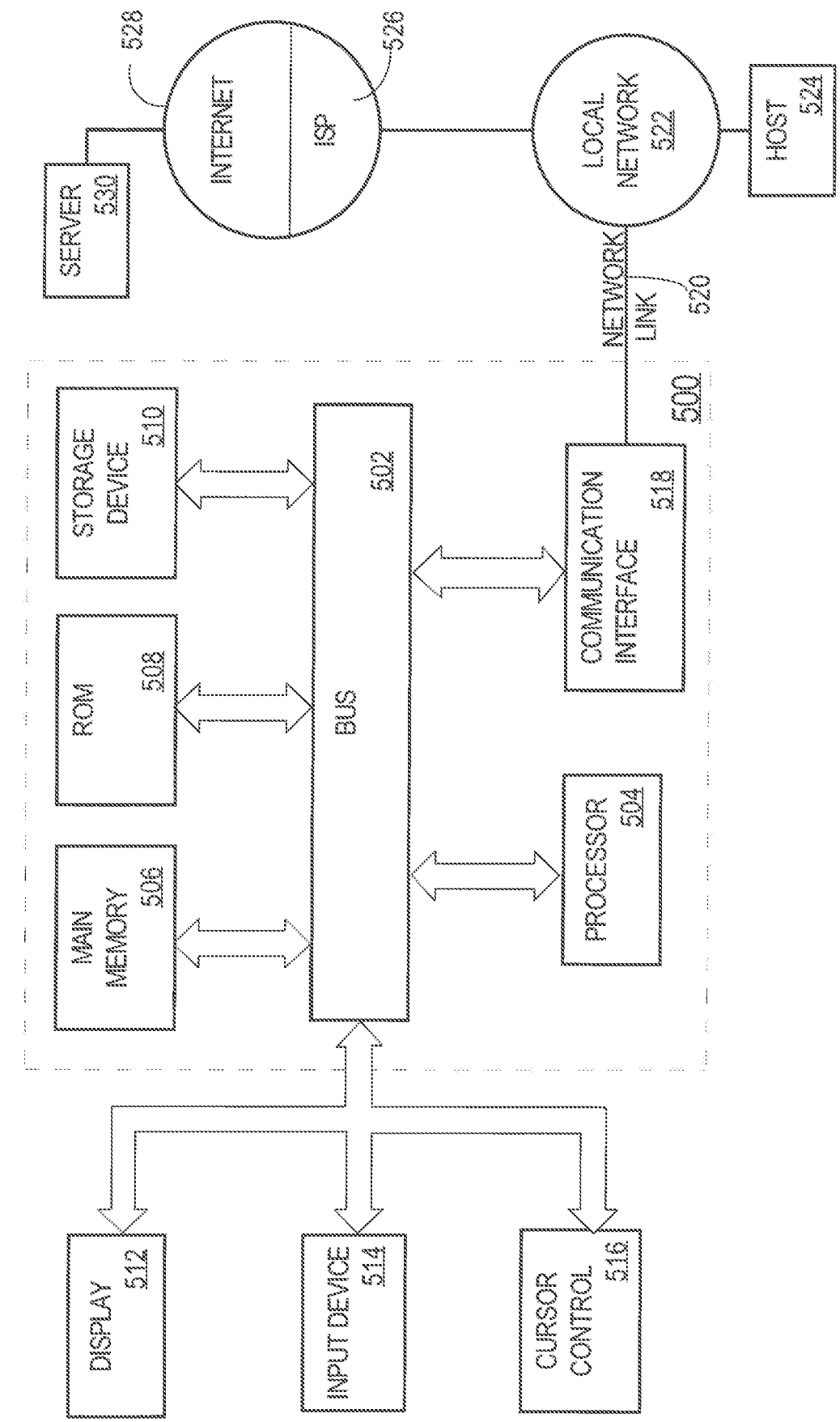
FIG. 5 illustrates a computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Automated Task Generation Overview

Task generation has been performed by an administrator manually analyzing data about the systems under test and creating populating a task for submission to the researcher computers. These methods can require large amounts of time and attention by human administrators.

In contrast, in embodiments, automated task generation by the launch point computer 206 and the management computer 207 may be used in addition to manual task generation to obtain one or more tasks that can be assigned to the researcher computers 202. By automating task generation, the candidate security vulnerabilities can be assigned to researcher computers promptly and without human intervention. Further, software patches generated to address known security vulnerabilities can be promptly assigned to a researcher computer for verification, allowing for faster updates of the software and reducing harm done via the security vulnerabilities. Automated task generation can be used to initiate tasks for evaluating uninvestigated host systems, applications, or APIs in the systems under test.

The tasks that are automatically generated using the approaches herein are assignable to one or more researcher computers. Before assignment, each task of the generated tasks can be associated with one or more properties including task type, task expiration, consensus requirement, and task incentive. A task type is a characterization of the task that indicates, for example, an objective of the task, expertise required to complete the task, urgency of the task, or relative value of the task. A task expiration indicates a time at which an assigned, uncompleted task will be un-assigned from an assigned researcher computer and re-assigned to a different researcher computer. A consensus requirement indicates whether the task is associated with a requirements that two or more researcher computers agree on a result of the performance of the task before the task is considered to be complete. A task incentive is a reward granted to one or more researcher computers upon successful completion of the task or successful partial completion of the task. Other properties can be defined for the tasks depending, for example, on the nature of the task, the difficulty of the task, or security restrictions.

In one embodiment, tasks are generated automatically in response to detecting the presence or availability of new software such as a new application or a new patch. Detection may occur through detecting a change in configuration data that identifies a new version, or by periodically polling a source location, such as a vendor's website that facilitates downloads of different versions of software, and detecting that a new title or version is present via, for example, syntactic analysis of web pages or other content. Detection may occur by parsing the content of an e-mail, received in an e-mail server system, which announces a new name, title or version. Detection may be performed by integration with continuous deployment and integration servers such as Jenkins, TeamCity, etc. As code is provided by developers and deployed to servers, a task may be generated to explore recent changes in the software for vulnerabilities. The objective of tasks generated in such an embodiment is to verify that the new software does not have any readily detectable security vulnerabilities.

Other tasks may be generated automatically in response to a detection of an indicator of compromise in a running application. Indicators of compromise may include, for example, unusual account behaviors, strange network patterns, unexplained configuration changes, and odd files stored on systems. Indicators of compromise may be received at the launch point computer 206 from another process that is executing the running application at a researcher computer. In some embodiments, the indicators of compromise for web applications, mobile applications, and host infrastructure are conducted from the launch point computer 206 or the management computer 207. The objective of these other tasks is to investigate the detected indicator of compromise and report the cause of the detected indicator of compromise. Other objectives can include generation of a patch or otherwise rectifying the running application.

Some tasks are difficult for the researcher computers to complete. In these instances, the tasks may expire without the researcher computer completing the task, even though the researchers associated with the assigned researcher computers are diligently attempting to perform the task. In these instances, the researchers may become discouraged and may cease working on the task. To incentivize the researchers to continue to work on the task, the task incentive can be changed or additional task incentives for partial completions of the task can be created.

7. Systems for Automated Task Generation, Distribution, and Evaluation

Figure 6:
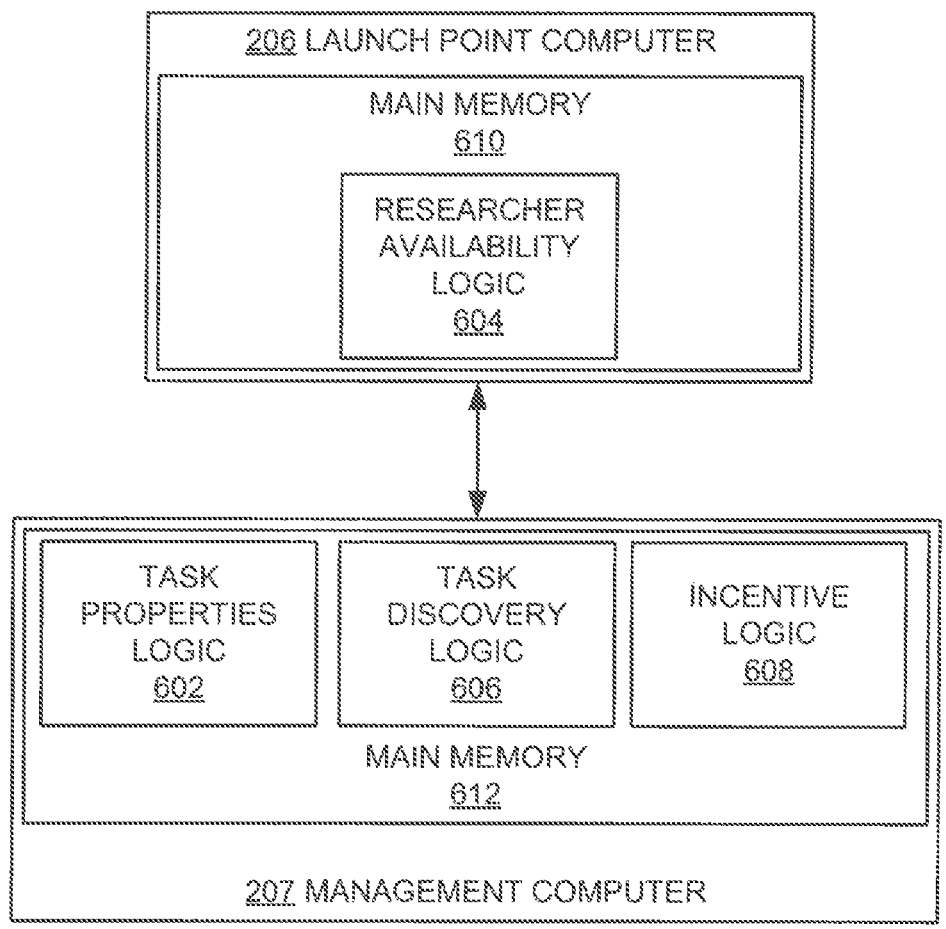
FIG. 6 illustrates an example portion of the computer system arrangement of FIG. 2 that may be used for automatically generating, distributing, and evaluating competition of one or more tasks.

FIG. 6 is an example portion of the computer system arrangement of FIG. 2 that may be used for automatically generating, distributing, and evaluating competition of one or more tasks, according to various embodiments. FIG. 6 comprises the launch point computer 206 (also referred to as a control computer) having main memory 610 which stores researcher availability logic 604. The management computer 207 includes main memory 612 which stores task properties logic 602, task discovery logic 606, and incentive logic 608. Each of the items of logic in FIG. 6, and in all other drawing figures herein, may represent a region or set of one or more pages of main memory storing programmed instructions which when executed cause performing the process steps or algorithm steps that are disclosed herein. Thus the logic elements do not represent mere abstractions but represent real pages of memory that have been loaded with executable instructions.

The task properties logic 602 comprises executable instructions that, when executed, cause the management computer 207 to obtain a task that identifies a potential security vulnerability of one or more systems under test. For automatically executed tasks, the launch point computer 206 may run software to poll for tasks and execute tasks provided by the management computer 207. For manually generated tasks, researchers retrieve tasks via the management computer 207 from a user interface and run the task manually. The task may be received from, for example, the task discovery logic 606 in the management computer 207. The task properties logic 602 determines one or more properties associated with the obtained task. The properties include the task type and task expiration. The task type may be determined based on how the task was obtained or an entity from which the task was received. For example, if a task is received from a system under test, the task may be a patch verification task in which the objective is to verify that new software has no or few potential security vulnerabilities nor does it introduce security vulnerabilities into the system under test. If a task is received from the task discovery logic 606, the task may include an identification or description of one or more indicators of compromise and an affected system under test. The task may have the objective of evaluating the system under test, determining whether a security vulnerability exists, or removing the security vulnerability. The task properties logic 602 further determines whether the task is associated with a consensus requirement based on a task type and the system under test.

The researcher availability logic 604 comprises executable instructions that, when executed, cause the management computer 207 to determine a respective expertise and availability of a researcher computer to complete the task. The researcher availability logic 604 may compare the task type as determined by the task properties logic 602 to expertise of one or more researcher computers. The comparison results in an identification of a plurality of researcher computers. From the plurality of the researcher computers, available researcher computers are identified. The availability of the researcher computers may be based on a geographic time zone of the researcher computer, whether the researcher computer has indicated its availability for the present time, or whether the researcher computer has responded to requests to take on one or more tasks.

Task discovery logic 606 comprises executable instructions that, when executed, cause a computer in the networked environment to identify one or more potential security vulnerabilities from various sources and to send the one or more potential security vulnerabilities to the task properties logic 602 as tasks. The task discovery logic 606 identifies security vulnerabilities based on indicators of compromise reported by one or more systems under test and based on receiving a notification that a patch or new application is awaiting validation.

Incentive logic 608 comprises executable instructions that, when executed, cause the management computer 207 to automatically change an offered task incentive when a task is not completed in a timely manner. The incentive logic 608 uses data collected from monitoring the researcher computers to determine that, despite the diligence of the researcher computers, the task is not completed. The task may, for example, be more complex than initially thought or may be related to a new, as yet unknown security vulnerability. The incentive logic 608 may, for example, define one or more incentives for partial completion of the task, offer an increased reward for completion of the task, or offer a progressive reward that increases over time until the task is completed.

8. Methods for Task Generation

Figure 7:
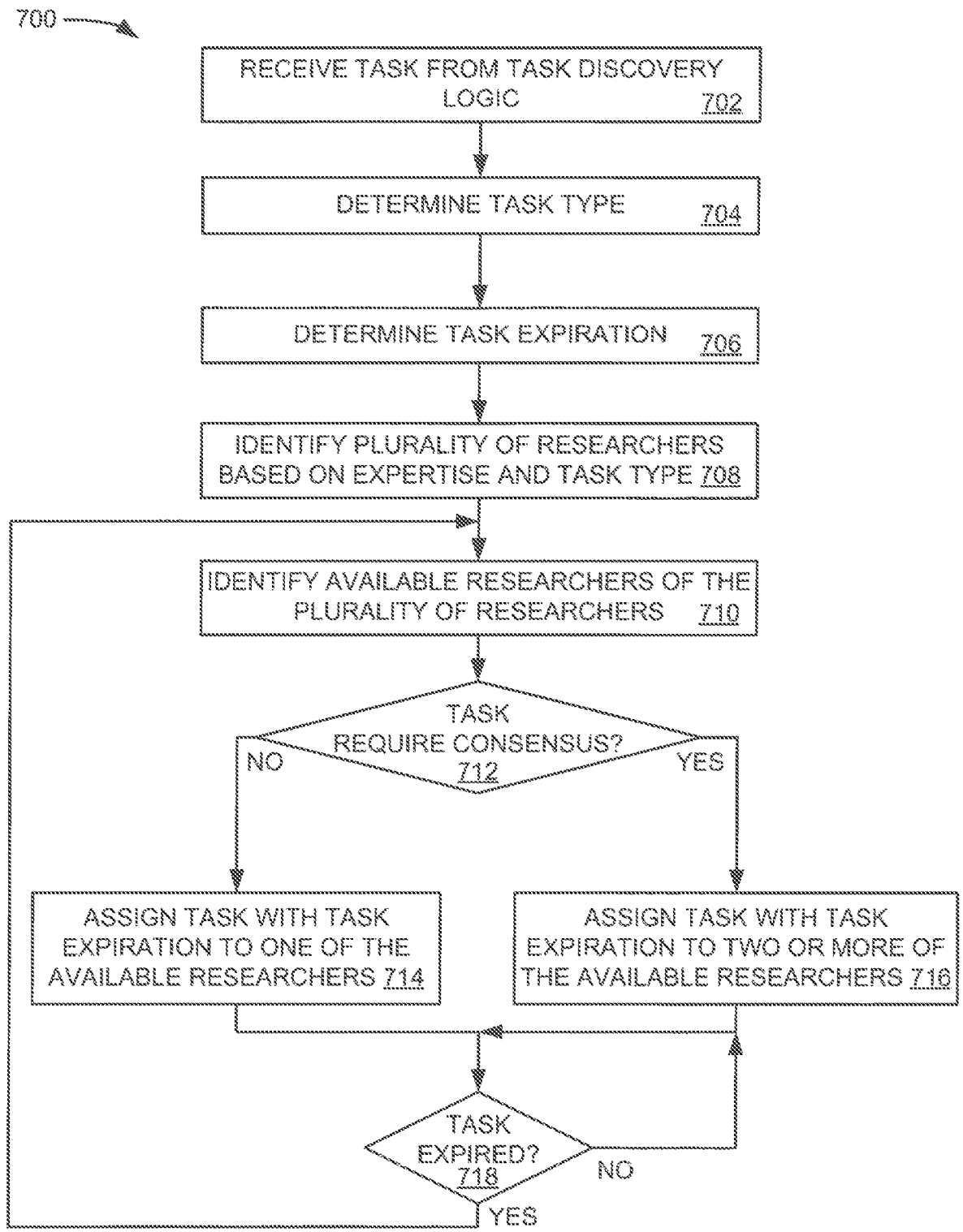
FIG. 7 illustrates an algorithm or a process for automatically generating one or more tasks.

FIG. 7 illustrates an algorithm or a process for automatically generating one or more tasks according to various embodiments. The process 700 may be performed by, for example, the management computer 207 executing task properties logic 602 and the launch point computer 206 executing the researcher availability logic 604. The process 700 receives a task and generates additional information about the task, such a task type, task expiration, and whether the task is associated with a consensus requirement. The process 700 occurs concurrently with the process of FIG. 1 as described below to automate task creation and to initiate re-assignment incomplete expired tasks.

In an operation 702, the executed task properties logic 602 receives a task from the task discovery logic 606. The task discovery logic 606 can generate tasks according to process 800. The task may include an identifier of the system under test, a description of the potential security vulnerability, partial or complete credentials to the system under test, and other information relating to the task.

In an operation 704, the executed task properties logic 602 determines the type of the task. The type of the task may be determined based on known information about the potential security vulnerability described in the task, one or more known characteristics of the system under test, and the respective expertise of the researcher computers. The task type may comprise an objective of the task, expertise of the researcher computers to complete the task, an urgency of the task, and other task properties.

In an operation 706, the executed task properties logic 602 determines a task expiration based on the urgency of the task. The urgency of the task may be determined using the objective of the task. For example, patch validation tasks may have a higher urgency than tasks generated based on indicators of compromise (IOCs). The task expiration is a time at which the task will expire if not complete. If a task assigned to a researcher computer expires, the task can be re-assigned to another researcher computer.

In an operation 708, the executed researcher availability logic 604 identifies a plurality of researchers associated with the requisite expertise corresponding to the task type of the operation 704. The plurality of researchers are identified from a larger pool of enrolled researchers assessed and enrolled in the operation 104.

In an operation 710, the executed researcher availability logic 604 identifies, from the plurality of researchers, one or more available researchers who can be assigned the task. The availability of the respective researchers may depend on, for example, whether the researcher is concurrently working on a previously assigned task, a time of day in the researcher's geographical location, and whether the researcher has indicated that she is available or unavailable at present. In some instances, the researcher's availability may be indicated by the researcher having logged in to the launch point computer 206 or by determining a level of effort of the researcher by analyzing the traffic transmitted through the launch point computer 206. In some instances, the operations 708 and 710 may be performed as a single operation.

In an operation 712, the executed task properties logic 602 determines whether the task is associated with a consensus requirement, that is, whether two or more researcher computers must agree on the result of the task before the task is considered to be complete. Some tasks, due to complexity or uncertainty is the results, are subject to the consensus requirement.

In an operation 714, if the task does not require consensus, the launch point computer 206 assigns the task to one of the available researchers according to the operation 106. In an operation 716, if the task does require consensus, the launch point computer 206 assigns the task to two or more of the available researchers according to the operation 106. It is noted that the imposition of the consensus requirement is not the only reason the launch point computer 206 may assign the task to two or more researcher computers.

In an operation 718, the executed researcher availability logic 604 determines whether the task has expired using the task expiration of the operation 706. If the task has not expired, the process 700 remains in the operation 718 until the task expires. If the task has expired, the process 700 returns to the operation 710 to identify a different set of available researchers from the plurality of available researchers.

9. Task Discovery

Figure 8:
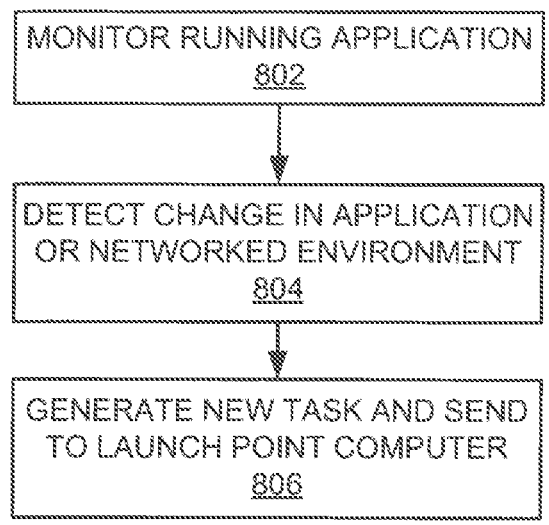
FIG. 8 illustrates an algorithm or a process for generating a task.

FIG. 8 illustrates an algorithm or a process for generating a task, according to various embodiments. The process 800 is performed by the task discovery logic 606 in the management computer 207. The process 800 can be used to generate at least two types of tasks: patch verification tasks and machine-generated tasks. Other tasks may include: new feature vulnerability and security assessment, indicator of compromise investigation, and generic vulnerability discovery effort. A generic vulnerability discovery effort may be defined by a period of time expected from the researcher, such as, "spend 4 hours looking for SQL injections in this application, or portion of this application."

In an operation 802, the task discovery logic 606 monitors a running application at a system under test. In some embodiments, the running application generates and information about its activity to the task discovery logic 606. In some instances, the task discovery logic 606 may request information or a patch from the systems under test.

In an operation 804, the task discovery logic 606 detects a change in an application or networked environment in the system under test. The change may indicate a potential security vulnerability. In some embodiment, an IOC finder tool may be used to collect host system data and report the presence of Indicators of Compromise (IOCs). One example of an IOC finder tool is IOC Finder distributed by MANDIANT® of Alexandria, Va. In response to detecting a change corresponding to an IOC, the IOC finder tool may provide electronic documents used by researcher computers and that capture diverse information about potential security vulnerabilities.

Indicators of Compromise (IOCs) comprise unusual account behaviors, strange network patterns, and other evidence of a potential security vulnerability in the system under test. The IOCs are not necessarily determinative that a security vulnerability exists but can be used to generate tasks for researcher computers. The researchers computers, by performing the task associated with an IOC can then determine the presence or absence of a security vulnerability. The following is a non-exhaustive list of IOCs that can be detected as part of the operation 804: unusual outbound network traffic, anomalies in privileged user account activity, geographical irregularities, log-in irregularities and failures, swells in database read volume, HTML Response sizes indicating an SQL injection attack, large numbers of requests for the same file, mismatched port-application traffic occurring when an application attempts to us an unusual port, suspicious registry or system file changes, DNS request anomalies, unexpected patching of systems, mobile device profile changes, bundles of aggregated data in unexpected storage locations, unexplained encrypted files in unexpected storage locations, web traffic that does not match typical human behavior, and signs of distributed denial-of-service attacks (DDOS) like slow network performance, unavailability of websites, firewall failover, or back-end systems at maximum capacity for unknown reasons.

In some instances, a task is generated based on determining that a host system of the one or more systems under test has not been evaluated for potential vulnerabilities. Tasks may be used to ensure sufficient level of effort by the researchers in security testing/vulnerability discovery efforts. Tasks may be used to distribute effort of a number of researchers across multiple targets based upon level of effort calculated from traffic transmitted through the launch point computer 206. By doing so, each target receives proper coverage in the analysis of security flaws, and the launch point computer 206 drives human operators to the points of change in addition to the points in the application that have received little attention and may be stale.

In an operation 806, the task discovery logic 606 generates a new task based on the detected change. The new task includes a unique task identifier and identifies the system under test in which the change was detected, the detected change or IOC, and other known information about the potential security vulnerability. The task can optionally specify one or more researcher computers to be assigned the task using, for example, a history a tasks previously performed by the researcher computer or a history of systems under test previously investigated by the researcher computer. In some embodiments, the security vulnerability may be identified using the Common Vulnerabilities and Exposures (CVE) system. The CVE system provides a reference-method for publicly known information-security vulnerabilities and exposures. Each potential security vulnerability may be associated with one or more CVE identifiers that are unique, common identifiers for publicly known information-security vulnerabilities in publicly released software packages. In some instances, the task can instruct that a task host system be evaluated for potential security vulnerabilities.

In some instances, the task can be generated in response to receiving a notification from a researcher computer that a patch has been created for the system under test. These tasks, referred to as patch verification tasks, can be initiated when a researcher computer submits a potential security vulnerability. In some embodiments, the submitting researcher computer has a right of first refusal to accept, reject, or ignore the patch verification task corresponding to the potential security vulnerability identified by the submitting researcher computer. The submitting researcher computer may have a limited period of time in which to accept the patch verification task before the patch verification task is assigned to one or more other researcher computers. The patch verification task is further associated with a task expiration, as discussed in connection with operation 706.

The generated task is then sent to the launch point computer that obtains the task in the operation 702.

10. Task Incentives

Figure 9:
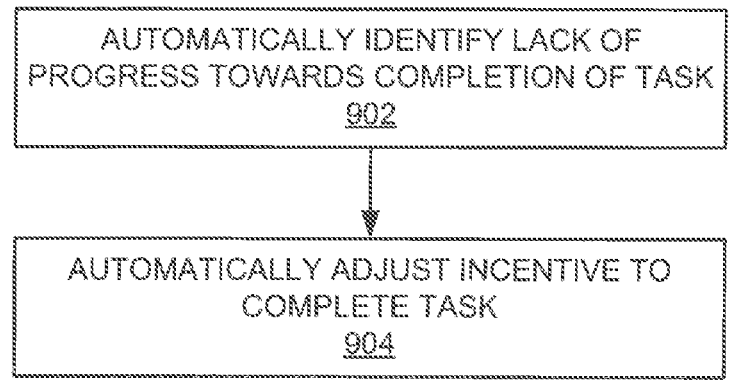
FIG. 9 illustrates an algorithm or a process for automatically changing an incentive associated with a particular task.

FIG. 9 illustrates an algorithm or a process for automatically changing an incentive associated with a particular task, according to various embodiments. The incentive logic 608 may cause the management computer 207 to perform the process 900 to modify an incentive offered to the researcher computer for completing a task. Some tasks may be improperly incented and are thus not accepted or completed by the one or more researcher computers. The process 900 can be performed after the task has been assigned but before the task is completed. In some instances, the process 900 is performed before the task expiration so that the assigned researcher computers can continue working on the assigned task. In other instances, the process 900 is performed after task expiration and before the task is re-assigned to one or more other researcher computers.

In an operation 902, using the monitored communications of the operation 108, the executed incentive logic 608 automatically, without human intervention, identifies a lack of progress towards completion of the assigned task. The lack of progress may be indicated by extended time periods in which the researcher computer did not communicate with the system under test; repeated, failed attempts to access the system under test; or repeated, failed attempts to reproduce the potential security vulnerability or to perform other actions related to the potential security vulnerability and/or the system under test. In some embodiments, the lack of progress may be reported by the researcher computer.

In an operation 904, the executed incentive logic 608 automatically, without human intervention, adjusts an incentive to complete the task. The incentive may be adjusted based on an adjusted vulnerability score 420 of FIG. 4B that increases or decreases the fee 430. The incentive can be restructured in a variety of ways. For example, the incentive can be structured as a progressive jackpot where the incentive increases as a function of time. The incentive can be divided so that a portion of the total incentive is distributed upon partial completion of the task.

11. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    using an automated scanning system logically positioned between one or more systems under test that are owned or operated by a third party and a vulnerability database, monitoring an application executed by the one or more systems under test;
    detecting a change in the application or in a networked environment of the one or more systems under test;
    generating a specific task comprising a description of the detected change that identifies a potential security vulnerability of the one or more systems under test;
    using a control computer that is logically positioned between at least one researcher computer and the one or more systems under test, obtaining the task;
    using the control computer, determining a task type of the task, the task type associated with particular skills for investigating the potential security vulnerability;
    using the control computer, identifying, from a larger plurality of researcher computers having disparate skills, a plurality of researcher computers who each have the particular skills for the determined task type;
    using the control computer, determining a task expiration of the task using at least the task type, the task expiration indicating a time at which the task if assigned and uncompleted will be reassigned;
    using the control computer, determining that the task type further requires consensus among two or more researcher computers;
    using the control computer, determining a respective availability of the plurality of researcher computers;
    using the control computer, assigning the task to two or more researcher computers of the plurality of researcher computers determined to be available to complete the task based on the task expiration of the task and the respective availability of the plurality of researcher computers;
    using the control computer, determining an incentive to the two or more researcher computers based on a vulnerability score corresponding to the potential security vulnerability or a perceived asset value of the one or more systems under test;
    using the control computer, monitoring communications between the two or more researcher computers and the one or more systems under test, wherein the communications relate to attempting to identify the potential security vulnerability of the one or more systems under test in performing the task assigned by the control computer, the monitoring comprising identifying any lack of progress toward completion of the assigned task;
    using the control computer, adjusting, in response to identifying a lack of progress toward completion of the assigned task, the incentive to complete the assigned task, and sending a message to one or more of the plurality of researcher computers that indicates the adjusted incentive for full or partial completion of the task;

using the control computer, validating reports of the potential security vulnerability of the one or more systems under test that are received from researcher computers that have performed the assigned task, the validating comprising determining consensus among the researcher computers;

using the control computer and in response to successfully validating the reports of the potential security vulnerability of the one or more systems under test, determining and providing an incentive to each one of the researcher computers from whom the reports have been received, the determining being based further on a submission quality score that represents a quality of each report.

2. The method of claim 1, further comprising:
determining that a host system of the one or more systems under test has not been evaluated for potential vulnerabilities;
generating a second task identifying the host system.

3. The method of claim 1, wherein the task type comprises evaluating a host system, investigating a change in at least one of the one or more systems under test, or patch verification.

4. The method of claim 1, wherein determining a respective availability of the plurality of researcher computers comprises
accessing a schedule of tasks associated with the respective researcher computer and determining customary hours of work of the respective researcher computer.

5. The method of claim 1, further comprising:
marking the task as complete in response to determining that the reports are in consensus;
in response to determining that the reports are not in consensus, assigning the task to a second set of two or more researcher computers of the plurality of researcher computers determined to be available to complete the task based on the respective availability of the two or more researcher computers.

6. The method of claim 1, further comprising:
determining that the task has expired using the task expiration; assigning the task to a second one or more researcher computers of the plurality of researcher computers determined to be available to complete the task based on the respective availability of the one or more researcher computers.

7. The method of claim 6, wherein
the incentive is adjusted based on a number of hours spent by the one or more researcher computers on the task, a number of similar tasks directed to investigating the potential vulnerability, a diversity of the similar tasks, a historical vulnerability of the one or more systems under test.

8. A system comprising:
one or more processors;
a non-transitory computer-readable medium having instructions embodied thereon, the instructions when executed by the one or more processors to cause:
using an automated scanning system logically positioned between one or more systems under test that are owned or operated by a third party and a vulnerability database, monitoring an application executed by the one or more systems under test;
detecting a change in the application or in a networked environment of the one or more systems under test;
generating a specific task comprising a description of the detected change that identifies a potential security vulnerability of the one or more systems under test;

using a control computer logically positioned between at least one researcher computer and the one or more systems under test;

using the control computer, determining a task type of the task, the task type associated with particular skills for investigating the potential security vulnerability;

using the control computer, identifying, from a larger plurality of researcher computers having disparate skills, a plurality of researcher computers who each have the particular skills for the determined task type;

using the control computer, determining a task expiration of the task using at least the task type, the task expiration indicating a time at which the task if assigned and uncompleted will be reassigned;

using the control computer, determining that the task type further requires consensus among two or more researcher computers;

using the control computer, determining a respective availability of the plurality of researcher computers;

using the control computer, assigning the task to two or more researcher computers of the plurality of researcher computers determined to be available to complete the task based on the task expiration of the task and the respective availability of the plurality of researcher computers;

using the control computer, determining an incentive to the two or more researcher computers based on a vulnerability score corresponding to the potential security vulnerability or a perceived asset value of the one or more systems under test;

using the control computer, monitoring communications between the two or more researcher computers and the one or more systems under test, wherein the communications relate to attempting to identify the potential security vulnerability of the one or more systems under test in performing the task assigned by the control computer, the monitoring comprising identifying any lack of progress toward completion of the assigned task;

using the control computer, adjusting, in response to identifying a lack of progress toward completion of the assigned task, the incentive to complete the assigned task, and sending a message to one or more of the plurality of researcher computers that indicates the adjusted incentive for full or partial completion of the task;

using the control computer, validating reports of the potential security vulnerability of the one or more systems under test that are received from researcher computers that have performed the assigned task;

the validating comprising determining consensus among the researcher computers;

using the control computer and in response to successfully validating the reports of the potential security vulnerability of the one or more systems under test, determining and providing an incentive to each one of the researcher computers from whom the reports have been received, the determining being based further on a submission quality score that represents a quality of each report.

9. The system of claim 8, comprising:
determining that a host system of the one or more systems under test has not been evaluated for potential vulnerabilities;
generating a second task identifying the host system.

10. The system of claim 8, wherein the task type comprises evaluating a host system, investigating a change in at least one of the one or more systems under test, or patch verification.

11. The system of claim 8, wherein determining a respective availability of the plurality of researcher computers comprises
accessing a schedule of tasks associated with the respective researcher computer and determining customary hours of work of the respective researcher computer.

12. The system of claim 8, wherein the instructions when executed by the one or more processors further cause:
marking the task as complete when the reports are in consensus;
in response to determining that the reports are not in consensus, assigning the task to a second set of two or more researcher computers of the plurality of researcher computers determined to be available to complete the task based on the respective availability of the two or more researcher computers.

13. The system of claim 8, wherein the instructions when executed by the one or more processors further cause:
determining that the task has expired using the task expiration;
assigning the task to a second one or more researcher computers of the plurality of researcher computers determined to be available to complete the task based on the respective availability of the one or more researcher computers.

14. The system of claim 13, wherein
the incentive is adjusted based on a number of hours spent by the one or more researcher computers on the task, a number of similar tasks directed to investigating the potential vulnerability, a diversity of the similar tasks, and historical vulnerability of the one or more systems under test.

* * * * *